United States Patent [19]
Jones

[11] Patent Number: 5,937,450
[45] Date of Patent: Aug. 17, 1999

[54] METHOD AND DEVICE FOR ATTACHING FITTINGS TO RECEPTACLE

[75] Inventor: Butch Jones, Birmingham, Ala.

[73] Assignee: Jones-Stephens Corporation, Moody, Ala.

[21] Appl. No.: 08/852,580

[22] Filed: May 7, 1997

[51] Int. Cl.⁶ ............................... F04B 5/48; F16L 23/09
[52] U.S. Cl. ............................ 4/252.1; 4/252.4; 4/252.5; 4/252.6; 285/56
[58] Field of Search .................................. 4/252.1–252.6; 285/56–60, 347, 351

[56] References Cited

U.S. PATENT DOCUMENTS

| | | | |
|---|---|---|---|
| 2,976,543 | 3/1961 | Turner et al. ............................. | 285/56 |
| 3,037,212 | 6/1962 | Kleinhof ................................... | 285/58 |
| 3,349,412 | 10/1967 | Schwartz, et al. ....................... | 4/252.6 |
| 4,059,289 | 11/1977 | Morris et al. ............................. | 285/56 |
| 4,329,744 | 5/1982 | Cuschera .................................. | 4/252.5 |
| 4,547,005 | 10/1985 | Soederhuyzen ......................... | 285/58 |
| 5,695,222 | 12/1997 | Hodges . | |

FOREIGN PATENT DOCUMENTS

| | | | |
|---|---|---|---|
| 738638 | 7/1966 | Canada ................................... | 4/252.5 |
| 1247478 | 9/1971 | United Kingdom .................... | 285/56 |
| 1444078 | 7/1976 | United Kingdom .................... | 285/57 |

Primary Examiner—Charles R. Eloshway
Attorney, Agent, or Firm—Bullwinkel Partners, Ltd.

[57] ABSTRACT

An improved device and method for attachment of a plumbing fitting to a pipe or other drain receptacle is described in which the device has at least one elastomeric rib disposed about the outer circumference of the body of the device for forming a watertight seal against the interior wall of the drain receptacle. The ribs are angled in an axial direction opposite to the direction of insertion, allowing easy insertion into a drain receptacle, while causing a radial self-tightening force resisting movement in the direction of removal, and enhancing the seal. The device also allows lateral movement of the receptacle relative to the device, as well as expansion and contraction, without impairing the seal.

1 Claim, 2 Drawing Sheets

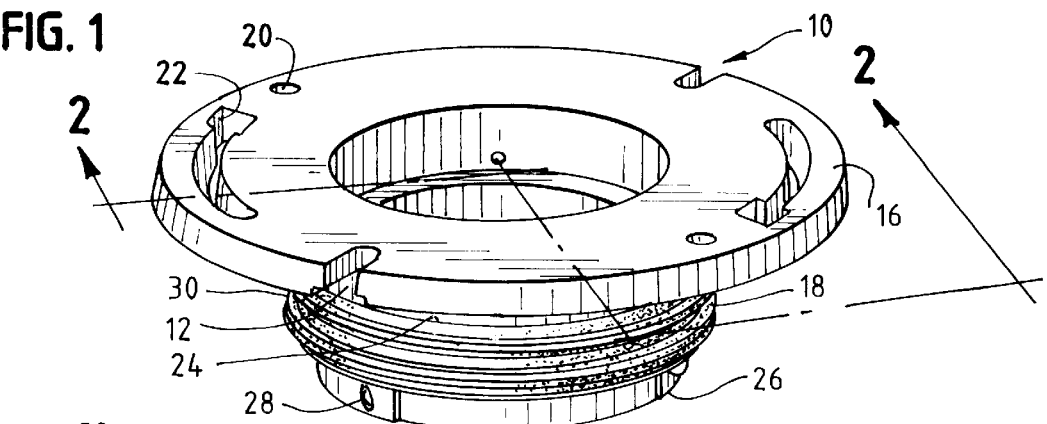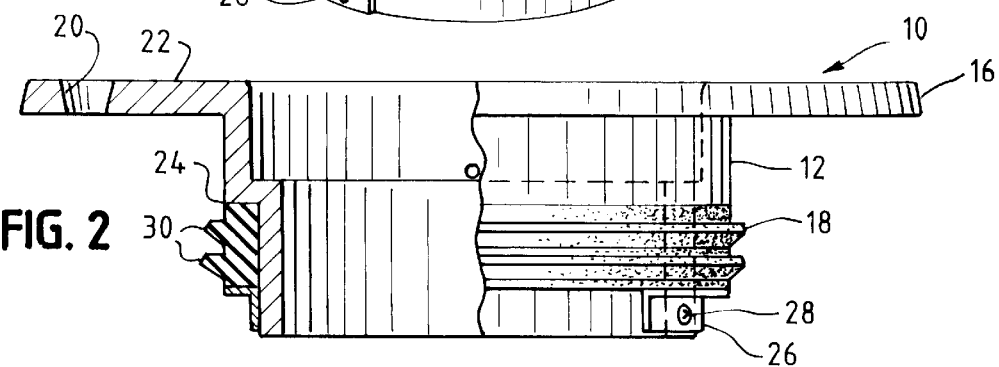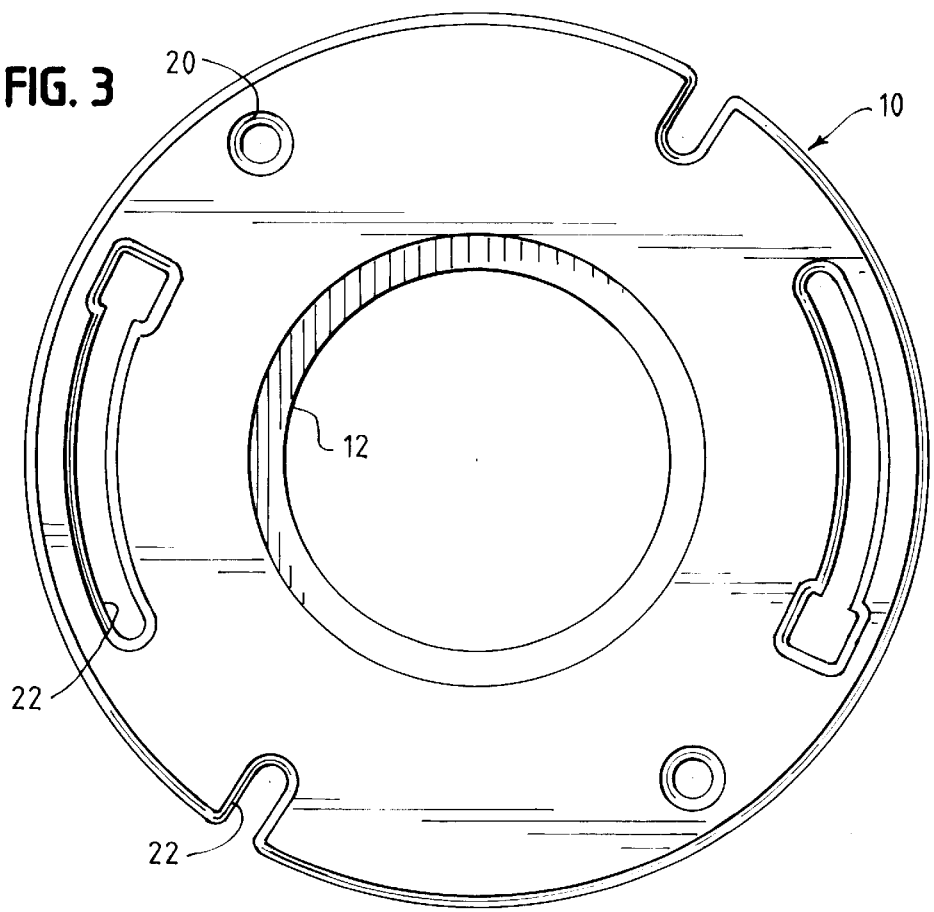

METHOD AND DEVICE FOR ATTACHING FITTINGS TO RECEPTACLE

BACKGROUND

1. Field of The Invention

This patent relates to plumbing devices. More particularly, this patent relates to a method and device for attaching fittings to a receptacle that can be used in new building construction in place of conventional means of attachment or as a replacement to conventional means of attachment in old buildings.

2. Description of the Related Art

Conventional methods of attaching closet flanges, area drains, floor drains, shower drains, roof drains or other fittings to receptacles such as drain pipe generally require the fitting and the receptacle to be connected in fixed relationship to one another, thus preventing any relative movement of the fitting and the receptacle. In locations that experience temperature changes, fittings and their receptacles may be subjected to expansion and contraction. Since fittings and receptacles often expand and contract at different rates, such relative movement can cause cracks to occur at the joint between fitting and receptacle which can eventually lead to leakage.

One such conventional method of attachment used with closet flanges is the lead and oakum method. This method requires chiseling out the concrete around the receptacle to make room for the fitting, placing the fitting over the receptacle, beating down oakum fiber between the receptacle and the fitting, pouring hot lead into the joint, allowing the lead to cool, then beating down the cooled lead.

The lead and oakum method of attaching such a fitting to a drain pipe or other receptacle is laborious and time consuming. It also can result in a fixed joint that is susceptible to expansion and contraction cracking.

It is therefore a principal object of the present invention to provide an improved method for attaching fittings to drain pipes or other receptacles for use in new building construction and for replacement of existing fittings in old buildings.

A further object of the present invention is to provide a method for attaching a fitting to a pipe or receptacle that allows for expansion and contraction of the fitting or receptacle and movement of the fitting with respect to the receptacle.

A still further object of the present invention is to provide a device that slips easily inside a receptacle for installation but resists removal in a way that serves to tighten the seal rather than loosen it.

A still further object is to provide a means of attachment that can be installed quickly and easily to provide a watertight seal between a fitting and a receptacle.

Further and additional objects will appear from the description, accompanying drawings, and appended claims.

SUMMARY OF THE INVENTION

The present invention is a device and method for attaching a fitting to a drain pipe or other receptacle. In one embodiment described in the figures, the device comprises a substantially cylindrical body section and a flange section extending radially outward from the upstream end of the body section. The flange section has a plurality of openings formed therein for receiving attachment means.

The body section has one or more radially extending ribs disposed around its outer circumference. Preferably, the ribs are angularly and upwardly disposed.

The ribs may be integrally formed as part of the body section, or, as in the embodiment illustrated herein, may be part of a gasket disposed around the outer circumference of the body section.

The method comprises placing the device as described above inside a receptacle such that the ribs are deformed inwardly to form a watertight seal against the interior wall of the receptacle.

BRIEF DESCRIPTION OF THE DRAWINGS

FIG. 1 is a perspective view of a device according to the present invention.

FIG. 2 is a side elevational view of the device of FIG. 1.

FIG. 3 is a top plan view of the device of FIG. 1.

DETAILED DESCRIPTION OF THE INVENTION

Figure 4:
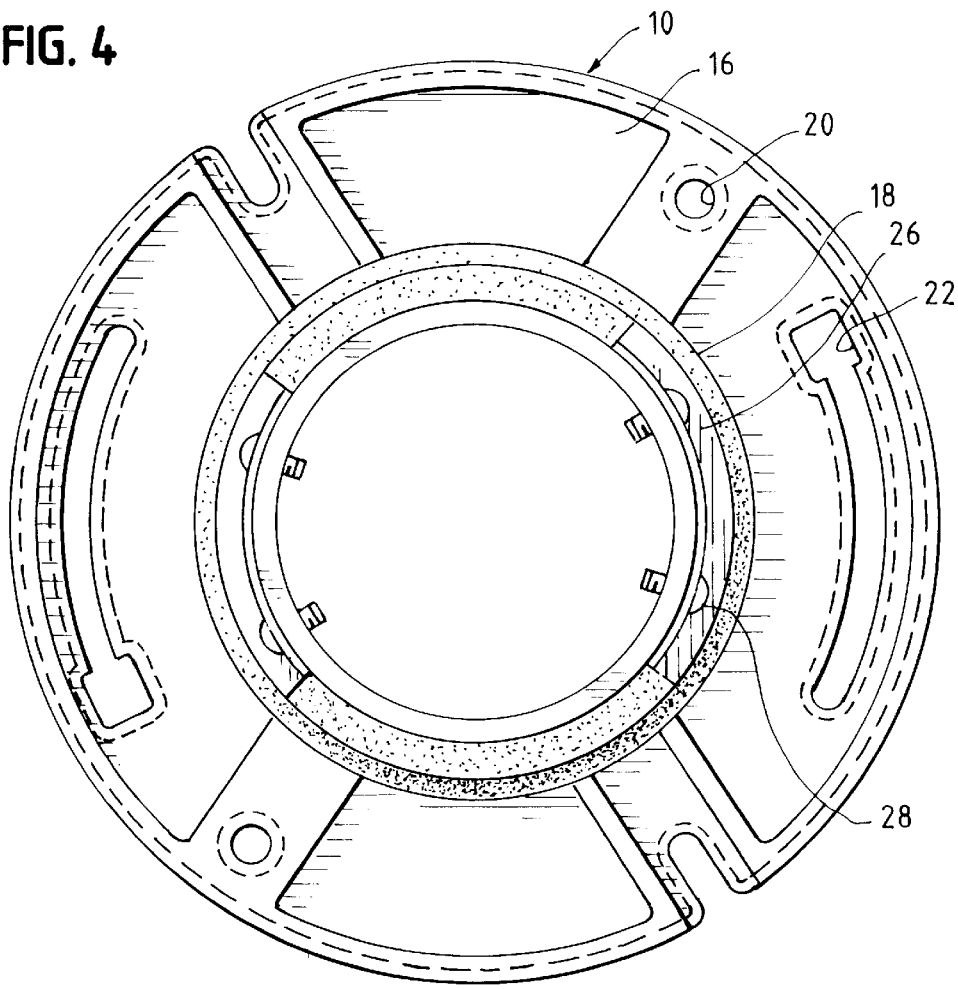
FIG. 4 is a bottom plan view of the device of FIG. 1.
Figure 5:
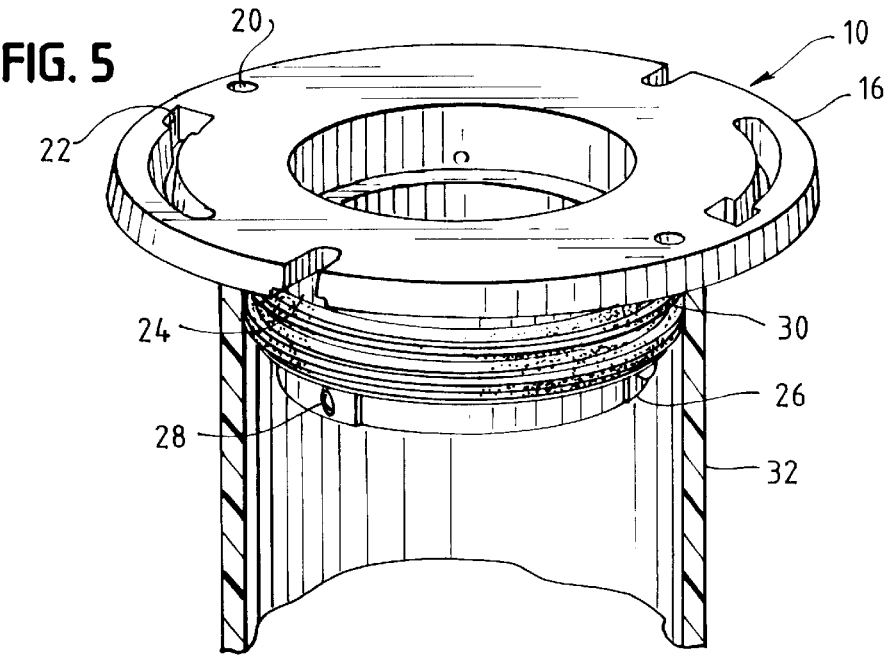
FIG. 5 is a perspective view of the device of FIG. 1 shown partially installed on top of a receptacle.

Turning to the drawings, there is shown in FIGS. 1 to 5 one embodiment of a device 10 according to the present invention. The device 10 comprises a substantially cylindrical body section 12, a flange section 16 and a ribbed gasket 18. The walls of the body section 12 are perpendicular to the flange section 16. The flange section 16 extends radially outward from the upstream end of the body section 12. A plurality of openings 20 and slots 22 displaced around the flange section are configured to receive bolts and the like for securing a toilet or other plumbing fixture (not shown) to the flange 10.

In the preferred embodiment the body section has an annular shoulder 24 formed on the outer circumference of the body section 12 against which the gasket 18 is seated. The gasket 18 may be further secured against the shoulder 24 with fastening means. In the embodiment shown in the figures, the fastening means is a pair of arc-shaped securing plates 26 attached to body section 12 with screws 28. However, it is anticipated that any fastening securing means may be used, or even no fastening means. In the latter instance, the gasket 18 is stretched over the body section 12 and remains secured by virtue of its own elasticity.

The gasket 18 comprises one or more outwardly extending elastomeric ribs 30 disposed about the outer circumference of the body section. The ribs 30 have an outer diameter slightly larger than the inner wall diameter (bore) of the receptacle 32 which can be a drain receptacle, shower drain, roof drain or the like. The receptacle 32 receives the body section 12 creating a seal between the ribs 30 and the receptacle 32.

In the preferred embodiment, the ribs 30 are angularly disposed in an upward (in this case upstream) direction such that, when the device 10 is inserted into the receptacle 32, the elastomeric ribs 30 bend inwardly. In this way, insertion of the flange into the receptacle 32 causes a slight deformation of the elastomeric ribs 30 in an inward radial direction, creating a watertight seal between the ribs 30 and the receptacle 32.

The improved device 10 is inexpensive to manufacture and easy to use. The device 10 includes novel structural features, first and foremost being angularly and upwardly extending ribs 30 that are useful in providing a watertight seal between a receptacle and the device.

A principal feature of the invention is that the device resists removal due to the self-wedging action created by movement opposite to the angle of the elastomeric ribs 30. In other words, the device is easy to insert into a receptacle, but because of the wedging action of the angled ribs, it resists removal. By reason of the direction of the angled ribs, movement of the fitting in the direction of removal will cause the seal to become even tighter.

For purposes of illustration, a closet flange is described herein as the preferred embodiment, but numerous other devices employing the unique rib design also fall within the scope of the invention, including area drains, floor drains, shower drains, roof drains and other plumbing fittings.

Other modifications and alternative embodiments of the invention are contemplated which do not depart from the spirit and scope of the invention as defined by the foregoing teachings and appended claims. The foregoing description and drawings are merely illustrative and not intended to limit the scope of the invention as claimed.

I claim as my invention:

1. A structural connector formed of a rigid material for connecting a toilet to a drain pipe, said structural connector comprising:

a radially extending connecting flange for connecting the structural connector to the toilet;

a cylindrical, downwardly extending portion for insertion into to the drain pipe; and a substantially cylindrical elastomeric body permanently secured to and surrounding the cylindrical, downwardly extending portion and having at least one rib extending in a direction opposite that of the direction of insertion.

* * * * *